March 29, 1960 L. E. KOCH 2,930,203
TEMPERATURE CONTROL SYSTEM FOR FREEZERS
Filed June 4, 1956 2 Sheets-Sheet 2

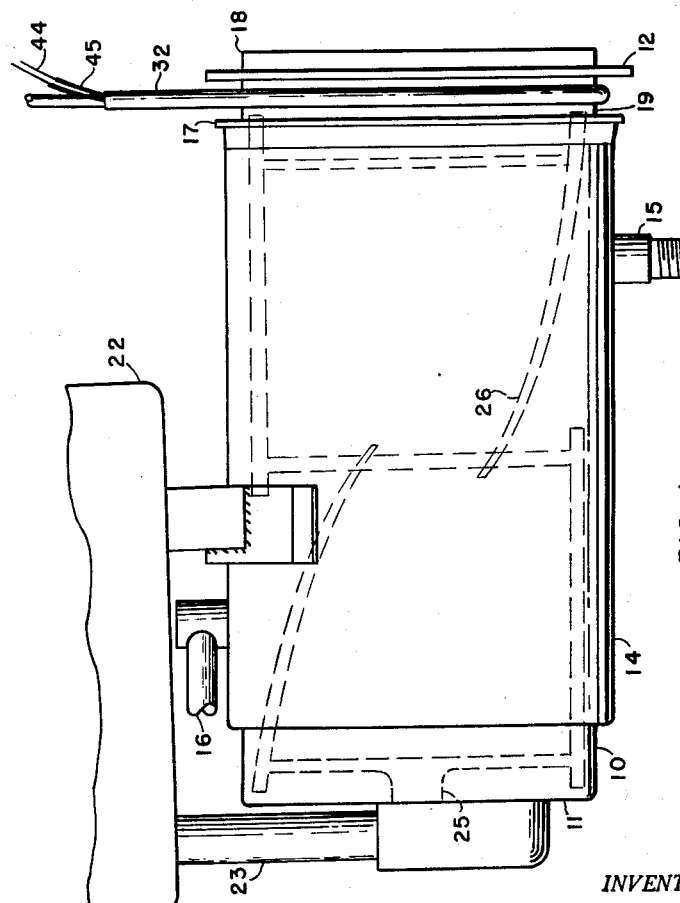
INVENTOR.
LAWRENCE E. KOCH
BY
James E. Nilles
ATTORNEY

INVENTOR.
LAWRENCE E. KOCH
BY
James E. Nilles
ATTORNEY

United States Patent Office 2,930,203
Patented Mar. 29, 1960

2,930,203

TEMPERATURE CONTROL SYSTEM FOR FREEZERS

Lawrence E. Koch, Beloit, Wis., assignor to Louis A. M. Phelan, Rockton, Ill.

Application June 4, 1956, Serial No. 589,290

7 Claims. (Cl. 62—135)

This invention relates generally to freezer mechanisms of the type in which various combinations of water, sugar, flavor, fats and other minor ingredients are fed into a freezer chamber and partially frozen therein. A rotary helical beater is mounted within the chamber which whips and aerates the mix and forces it out the serving valve as ice cream, custard, milk shake or sherbert, whenever a "draw" is made. In order to draw the product, it is necessary to have the beater rotate to insure product uniformity and also to provide a feed means for forcing the finished product out of the freezing chamber. More specifically, the invention relates to a temperature control system for such a freezer.

An object of this invention is to provide a temperature control mechanism for a freezer of the above type including a refrigeration anticipation means which is only operative to start the refrigerating means when the main temperature control switch is off, that is, when the refrigeration is off, and the product is being drawn from the freezer. When the refrigerating means is started, the anticipation means is rendered inoperative and does not effect the temperature at which the refrigeration is discontinued.

It is another object of the invention to provide a refrigeration anticipation means for a freezer temperature control system which is located in the system in a very sensitive and efficient location.

It is a specific object of the invention to provide a refrigeration anticipation means in the form of a resistance heater wire which is in direct contact with the temperature sensitive bulb of the temperature control circuit.

It is another object of the invention to provide a temperature control system, for a freezer, having a temperature sensitive bulb which is connected to the refrigerating shell and located relative thereto in such a manner that it will be substantially at product temperature and cause the product being served to be maintained at a constant temperature and consistent texture.

It is still another object of this invention to provide an extermely efficient freezer cylinder and tubular well construction and arrangement for a thermostatic element of a temperature control system. This novel construction and arrangement maintains the element at a temperature which is substantially the same as the product about to be served and permits the sensitive element to quickly and accurately reflect refrigeration requirements.

It is generally an object of the invention to provide an improved refrigeration anticipation means for a temperature control system of an ice cream or the like freezer.

Other objects and advantages will become more apparent from the following detailed description, taken in conjunction with the attached sheets of drawings in which, by way of preferred example only, is illustrated the invention. Accordingly, the present invention may be considered as comprising the various constructions, combinations or subcombinations of parts as is hereinafter more fully set forth in the detailed description and in the claims, reference being had to the accompanying drawings in which:

Figure 1 is a side elevational view of the freezer shell assembly with certain parts broken away or removed for the sake of clarity.

Figure 4 is a view of the temperature sensitive bulb tube showing the heater element applied thereto.

Figure 5:
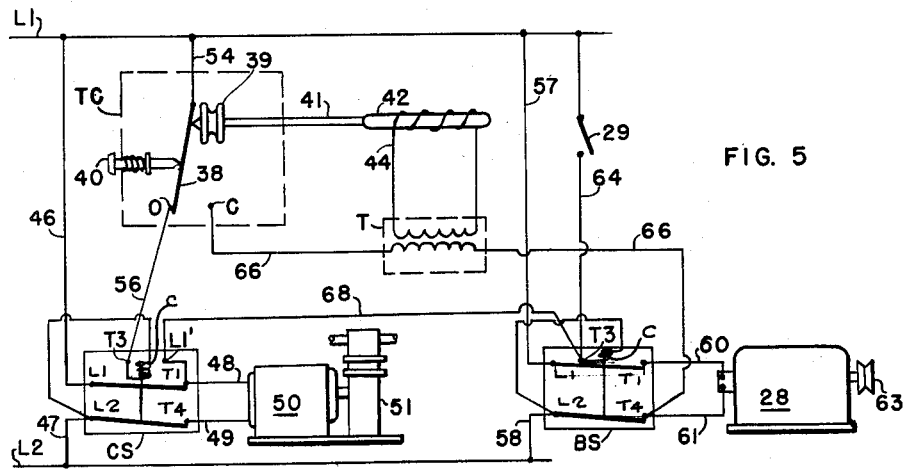
Figure 5 is a diagram of the electric circuit employed in the present control system.

Referring more particularly to the drawings, the freezing chamber comprises a horizontally disposed cylinder 10 having an integrally formed rear wall 11. A plate 12 surrounds a forward portion of cylinder 10 and is welded thereto to form a mounting means for a front cover (not shown) which contains the conventional serving valve adjacent its lower edge for dispensing finished product from the freezer. A jacket formed by a second cylinder 14 provides an annular chamber which surrounds a portion of the length of the freezing chamber and to which refrigerant is passed through inlet 15 and from which the refrigerant is taken by outlet 16. It will be noted that the front end 17 of jacket 14 terminates short of the front end 18 of the freezing cylinder 10 thereby providing an unrefrigerated portion 19 at the front end thereof. For a more detailed description of the general type of cylinder-jacket construction, if deemed necessary, reference may be had to the U.S. Patent No. 2,381,617, issued August 7, 1941, to L. A. M. Phelan an entitled, "Freezer Chamber and Evaporator." A mix supply tank 22 is located above the freezing cylinder and supplies fresh mix thereto through rear wall 11 by means of conduit 23. A conventional helical beater 26, indicated generally in Figure 1 by broken lines, is rotatably mounted by its shaft 25 within the cylinder 10 in the rear wall opening 27 and acts to whip and aerate the product being frozen and feed it forwardly toward the front end of the cylinder, forcing it out the serving valve when the latter is open. The beater 26 is rotatably driven in the well known manner by an electric motor 28, shown schematically in Figure 5. It should be noted that whenever the serving valve is open to draw product from the freezer, the beater 26 should be driven to insure proper uniformity and also to provide the necessary discharge pressure for the product. For this purpose a beater switch 29 (Figure 5) is provided in the electrical circuit and is located in a convenient place on the freezer adjacent the serving valve. The arrangement is such, as will hereinafter appear more fully, that the operator will switch "on" the beater 26 before making a draw.

In accordance with one object of the invention there is provided an extremely efficient well construction for a heat sensitive element of a temperature control system.

Figure 2:
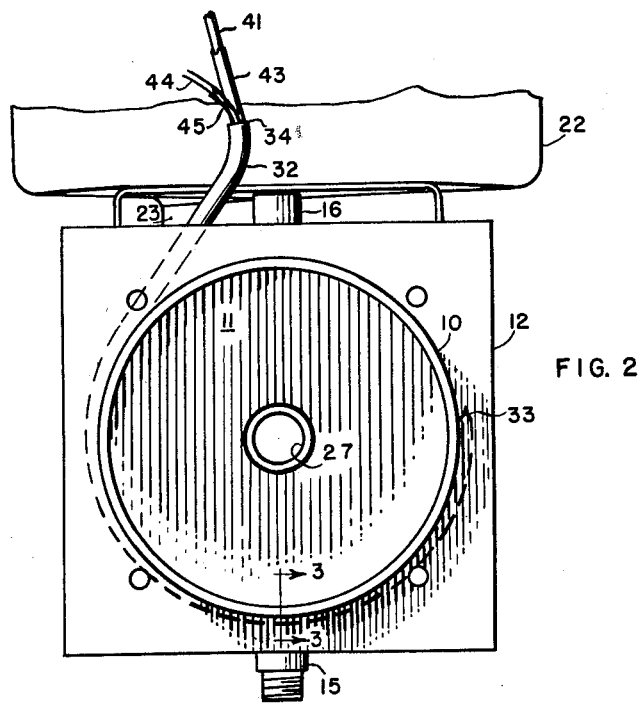
Figure 2 is a front end elevational view of part of the assembly shown in Figure 1.
Figure 3:
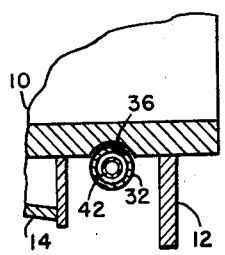
Figure 3 is a sectional view taken on line 3—3 of Figure 2, but on an enlarged scale, showing the freezer cylinder construction at the front end and the method in which the thermo-tube well is fastened thereto.

This well comprises a tube 32, preferably made of a metal of high heat conductivity, such as copper. This tube is of curved configuration, as shown in Figure 2, so as to embrace a substantial portion of the lower part of the unrefrigerated cylinder shell portion 19. The tubular well is closed, or sealed, at one of its ends 33 and its other end 34 terminates above the cylinder and is open for the reception of the heat sensitive device later referred to. The tube 32 is soldered to the portion 19 for a portion of its contact length so as to insure good heat transfer. It will be noted the tube is located adjacent the discharge end of the cylinder 10 at its lower side and at an unrefrigerated location. With such an arrangement, the heat sensitive element is located at a critical area, that is to say, where the temperature of the product about to be served can be accurately sensed. That portion of the product having the coldest temperature is located in this area and the present construction and arrangement insures that the heat sensing device will accurately reflect the temperature of the product about to be served. In order to even more accurately and quickly enable the heat sensitive device to sense the temperature of the product located in this critical area, the cylinder portion 19 may be of reduced wall thickness where the tube is attached thereto. For example, as shown in Figure 3, a groove 36 is cut around at least the lower portion of the periphery of cylinder 10 and tube 32 is soldered in this groove. This particular construction not only provides a very convenient mounting for the sensitive element, but also insures good transfer and distribution of heat along the vapor filled heat sensitive tube as will presently appear.

The temperature control system includes a temperature control TC (Figure 5) which is, per se, conventional and comprises an electric switch 38 operated by a spring loaded pressure expansible bellows 39 arranged to actuate the switch to one position O at one predetermined pressure and to a second position C at another pressure, a manually adjustable control 40 being provided to readily vary, over a range, the pressure at which the switch is actuated to one position. The bellows 39 is connected through capillary tube 41 with the thermostatic bulb 42. A flexible protective cover 43 is provided for the major portion of the length of tube 41. Tube 42 (commonly referred to as a "tube bulb"), tube 41 and the bellows 39 contain a suitable temperature responsive vapor, such as methyl chloride and the tube 42 is adapted to be inserted in tube well 32 so as to be in heat exchange relation with the product in the lower forward end of the freezing chamber. As is well known in the art, the bellows 39 expands and contracts by changes in vapor pressure which corresponds to the temperature of the coldest part of the bulb and thus initiates the refrigerating cycles when the temperature of the thermo-bulb 42 rises above that set by the manual control 40. In a freezer of this type, the manual temperature control 40 is set within the general range of 17 to 28 degrees Fahrenheit, depending on the type of product being made.

In order to provide a product having the proper characteristics, such as uniformity, texture, viscosity and overrun, it is imperative that the product temperature, as drawn from the freezer, be held within about one-half of one degree from that set by the manual control 40. When a large amount of the product is drawn off, the warmer liquid mix flow into the freezer cylinder 10 causes a temperature rise in the drawn product of more than the critical one-half degree before the heat sensing bulb 42 would sense the change and start the refrigerating means.

Therefore, in accordance with another object of the invention, a refrigeration anticipating means is provided which is effective to start the refrigerating means before the undesirable product temperature rise occurs. This refrigeration anticipator is so connected with other operating components of the freezer, that it is operative only when the beater is operating and the product being served is not at the required degree of coldness. Furthermore, the connection is such, that the anticipator is inoperative after the refrigeration has been started and then in no way effects the temperature control device in terminating the refrigeration cycle when the correct product temperature is obtained.

The refrigeration anticipating means chosen for illustrative purposes, and which has proved highly efficient from both a functional and operational cost standpoint, includes a fine wire 44 of suitably high resistance which is secured directly to the thermo-bulb 42 as by being wound therearound. The wire 44 thus forms a heater element which is electrically insulated from both the bulb 42 and the well 32 by the suitable insulating covering 45 (Figure 2). The illustrated type of heater element is preferred because it is conveniently mounted, economical and also because it provides small mass and good distribution of heat along the vapor filled bulb tube. This not only insures rapid and accurate action but does so on a small current consumption.

The preferred means chosen for illustrative purposes for heating the wire element 44 is a transformer T which has been found particularly suitable because of the limited length of the wire 44 and its insulation requirements. The wire is operated on the secondary of the transformer shown in Figure 5.

The compressor starter CS is connected to the power lines L1 and L2 by wires 46, 47 respectively. Wires 48 and 49 connect starter terminals T1 and T4, respectively, with the compressor motor 50 which in turn drives the refrigerant compressor 51 in the well known manner to circulate the refrigerant, such as Freon, through the freezer jacket 14. Wire 54 connects power line L1 with the single pole, double throw switch of the temperature control TC and wire 56 connects terminal "O" of the control with terminal T3 of the compressor starter. The beater starter BS is connected to power lines L1 and L2 by wires 57, 58 respectively. Wires 60 and 61 connect beater starter terminals T1 and T4 with the beater motor 28. The beater motor, through its pulley 63 is drivingly connected to the beater 26 by a flexible belt in a manner which is well known in this art. Beater switch 29, previously referred to, is connected between power line L1 and terminal T3 of the beater starter by wire 64. The contact terminal C of the temperature control TC is connected with terminal T4 of the beater starter BS, through the primary of the transformer T, by means of wire 66. An additional terminal L1' is incorporated in the compressor starter CS and is common to T1 thereof and is connected by wire 68 to terminal T3 of the beater starter. In either the compressor starter or the beater starter, when power is supplied to terminal T3 thereof, the operating coil C connected between T3 and L2 is energized and L1 becomes connected to T1 and L2 becomes connected to T4, by their respective conventional contact bars during the normal sequencing operation of the starter mechanism. When coils C are not energized the circuits open by gravity in the well known manner.

In operation, when the switch of the temperature control is closed to "O," power is supplied to the compressor starter CS to start the refrigeration system. The normal sequence of operation of the compressor starter causes L1' to become connected with terminal L1 of the compressor starter and power is thus furnished to terminal T3 of the beater starter, thus actuating the latter to start the beater motor. In other words, when the "O" terminal is closed, both the compressor and beater are started. In this situation, when refrigeration is being provided, the C terminal of the temperature control switch is open and the transformer is disconnected. The heat sensing element 42 is therefore ineffectual and the refrigerating cycle is terminated without aid or hindrance from the sensing element. When the desired degree of coldness is attained, as measured by the sensing bulb 42, the switch 38 opens the O terminal and closes the C terminal thus stopping the compressor and beater. In order to complete the circuit through the transformer it is necessary to close the circuit from T4 of the beater starter to power line L2 and this is done whenever the beater manual switch 29 is closed, thus furnishing power to terminal T3 of the beater starter and thereby operating the beater starter to start the beater motor.

For normal cycles, i.e., no product being drawn, the beater manual switch 29 remains open and the temperature control switch 38 operates the refrigeration system without interference from the anticipator heater 44. When product is being drawn, the operator has closed the beater switch 29 to operate the beater. At this time, if the temperature control switch is not closed to "O" to provide refrigeration, the transformer is energized and the heater element 44 warms the vapor bulb tube about 1 degree which in turn causes the temperature control switch to open the circuit to "C" and close the refrigeration circuit "O." This cycle is repeated for the duration of the draw, without any hunting effects in the system, as long as the beater manual switch is closed.

It will now be seen that the refrigeration is started early during a draw of product and a temperature rise of the product being served, due to the flow of warm liquid mix flow into the cylinder, is substantially reduced or entirely eliminated. If the draw is large enough, the temperature control switch will remain in the refrigeration circuit "O" closed position to provide continued refrigeration and the heater 44 will not come into operation.

In summary, the refrigeration anticipator means is used only to anticipate the need for refrigeration under the definite operating condition of product draw and then to eliminate a time temperature lag which would otherwise exist. The anticipator is so connected in the system that the amount of early operation can be controlled or limited and it cannot effect the temperature at which the refrigeration is discontinued.

It should be understood that it is not intended to limit the invention to the above described forms and details, and that the invention includes such other forms and modifications as are embraced by the scope of the appended claims.

I claim:

1. In a freezer having a beater for discharging a product therefrom; a source of electrical power, a beater driving means and a refrigeration means connectible to said power source, a two-position switch electrically connected to said power source and movable to one position to thereby connect said beater driving means and said refrigeration means to said power source, a temperature sensitive element for urging said switch to said one position when said element reaches a predetermined temperature, a resistance heater secured to said element and connectible to said power source through said switch when the latter is moved to another position to thereby heat said element.

2. A device as defined in claim 1 including a manual switch movable to a closed position to connect said beater driving means to said power source independently of said two position switch and to effect operation of said heater subsequent to movement of the two-position switch to said another position whereby said heater is connected to to said power source upon movement of both the two position switch to said another position and the manual switch to said closed position.

3. In a freezer apparatus including a freezing cylinder adapted to discharge finished product out one end, a refrigerant jacket surrounding said cylinder and terminating a distance spaced from said one end to provide an unrefrigerated cylinder portion, a tubular well secured around at least a part of said unrefrigerated portion and in heat transferring relation therewith, a beater rotatably mounted within said cylinder, an electrical control circuit including an electrical switch actuated to provide refrigeration by a temperature-responsive element which is mounted within said well, beater driving means and refrigerant supplying means operatively connected in said circuit, a heater for said element and so wired in said circuit so as to heat said element when said supplying means is inoperative and said beater is operating and thereby cause said supplying means to operate.

4. In a freezer apparatus including a freezing cylinder adapted to discharge finished product out one end and having a refrigerant jacket therearound and terminating a distance spaced from said one end to provide an unrefrigerated cylinder portion, a tubular well secured around at least a lower part of said unrefrigerated portion and in heat transferring relation therewith, a beater rotatably mounted within said cylinder, an electrical control circuit including an electrical switch actuated to provide refrigeration by a temperature-responsive element which is mounted within said well, beater driving means and refrigerant supplying means operatively connected in said circuit, a resistance heater connected directly to said element and so wired in said circuit so as to heat said element when said supplying means is inoperative and said beater is operating and thereby actuate said switch to provide refrigeration.

5. In a freezer apparatus including a freezing cylinder adapted to discharge finished product out one end, a refrigerant jacket surrounding said cylinder and terminating a distance spaced from said discharge end to provide an unrefrigerated cylinder portion, a tubular well secured around at least a part of said unrefrigerated portion and in heat transferring relation therewith, a beater rotatably mounted within said cylinder, an electrical control circuit, beater driving means and refrigerant supplying means operatively connected in said circuit, an electrical switch in said circuit and actuated to start said driving means and said supplying means by a temperature-responsive element which is mounted within said well, a heater for said element and so wired with said switch so as to heat said element when said supplying means is inoperative and said beater is operating and thereby actuate said switch to start said refrigerant supplying means.

6. In a freezer apparatus including a freezing cylinder adapted to discharge finished product out one end, said cylinder having an unrefrigerated cylinder portion adjacent said end, a well secured to said unrefrigerated portion and in heat transferring relation therewith, a beater rotatably mounted within said cylinder, an electrical control circuit including an electrical switch actuated to provide refrigeration by a temperature-responsive element which is mounted within said well, beater driving means and refrigerant supplying means operatively connected in said circuit, a heater for said element and so wired in said circuit so as to heat said element when said supplying means is inoperative and said beater is operating and thereby cause said supplying means to operate.

7. In a continuous freezer mechanism for ice cream and the like, the combination comprising, a refrigerated cylinder having a discharge end, said cylinder also having a beater rotatably mounted therein for moving a product toward and out of said discharge end, a well secured to said cylinder adjacent said discharge end and in heat transferring relationship therewith, a temperature-responsive element within said well, an electrical control circuit including an electrical switch which is actuated by said temperature-responsive element to provide refrigeration, beater driving means and refrigerant supplying means operatively connected in said circuit, and an electric heater for said element and so wired in said circuit so as to heat said element when said beater driving means is operating and said supplying means is inoperative to thereby cause the latter to come into operation.

References Cited in the file of this patent

UNITED STATES PATENTS

| | | |
|---|---|---|
| Re. 23,706 | Lange | Sept. 1, 1953 |
| 1,874,718 | Tyson | Aug. 30, 1932 |
| 1,917,751 | Chadwick et al. | July 11, 1933 |
| 2,280,434 | Huber | Apr. 21, 1942 |
| 2,316,285 | Raney | Apr. 13, 1943 |
| 2,324,395 | Hoop | July 13, 1943 |
| 2,336,092 | Grooms | Dec. 7, 1943 |
| 2,338,362 | Smith | Jan. 4, 1944 |
| 2,492,054 | Morrison | Dec. 20, 1949 |
| 2,559,032 | Tacchella | July 3, 1951 |
| 2,604,307 | Swenson | July 22, 1952 |
| 2,640,327 | Alsing | June 2, 1953 |
| 2,682,155 | Ayres | June 29, 1954 |
| 2,687,019 | Swenson | Aug. 24, 1954 |
| 2,706,385 | Topping | Apr. 19, 1955 |
| 2,747,375 | Pichler | May 29, 1956 |
| 2,804,773 | Domingo et al. | Sept. 3, 1957 |